United States Patent [19]

Komori et al.

[11] Patent Number: 5,056,420
[45] Date of Patent: Oct. 15, 1991

[54] GRILLES FOR AIR CONDITIONING

[75] Inventors: Takahiro Komori; Kazuo Fujihara, both of Inazawa; Hiroshi Iwata, Aichi, all of Japan

[73] Assignee: Toyoda Gosei Co., Ltd., Nishikasugai, Japan

[21] Appl. No.: 381,317

[22] Filed: Jul. 18, 1989

[30] Foreign Application Priority Data

| Jul. 27, 1988 | [JP] | Japan | 63-99691[U] |
| Aug. 8, 1988 | [JP] | Japan | 63-104804[U] |
| Nov. 8, 1988 | [JP] | Japan | 63-145804[U] |
| Nov. 25, 1988 | [JP] | Japan | 63-153884[U] |
| Mar. 16, 1989 | [JP] | Japan | 1-30170[U] |

[51] Int. Cl.$^5$ .............................. B60H 1/34
[52] U.S. Cl. ............................ 98/2; 98/40.24; 98/40.27
[58] Field of Search ............... 98/2, 40.24, 40.26, 98/40.27, 110, 121.2

[56] References Cited

U.S. PATENT DOCUMENTS

| 2,735,351 | 2/1956 | Abrahamsen | 98/40.26 |
| 3,177,797 | 4/1965 | Kennedy | 98/40.24 |
| 4,665,804 | 5/1987 | Miyasaka | 98/40.27 X |

FOREIGN PATENT DOCUMENTS

| 51-6643 | 1/1975 | Japan . |
| 51-2849 | 1/1976 | Japan . |
| 62-194160 | 8/1987 | Japan . |

Primary Examiner—Harold Joyce
Attorney, Agent, or Firm—Cushman, Darby & Cushman

[57] ABSTRACT

A grille for air conditioning for the instrument panel of an automobile is provided which includes a main case having an opening for blowing out a wind and a plurality of curvable wind direction adjusting plates supported so as to be rotatable relative to the main case. A support member supports the distal edges of the wind direction adjusting plates. The support member has extension plates respectively extending along an extending plane of the distal edge of each wind direction adjusting plate and coupling plates coupling the extension plates with each other. Each extension plate has a groove for receiving the distal edge which is not rotatable against the extension plate. The support member is movable on a circular locus relative to the main case, the arc having a shorter radius of curvature than a span between the two edges of the wind direction adjusting plate in an unstressed configuration.

19 Claims, 5 Drawing Sheets

GRILLES FOR AIR CONDITIONING

BACKGROUND OF THE INVENTION

1. Field of the Invention

The present invention relates to grilles for air conditioning which are installed in car interiors.

2. Description of the Related Art

As an example of a conventional grille for air conditioning which is installed mainly on the instrument panel provided inside a car, a grille, which is about to be described, is known (Japanese Utility Model Laid-open No. 51-2849). In this grille, the wind direction adjusting plates are made of leaf springs. These wind direction adjusting plates are mounted inside a case such that each plate curves to form a circular arc. Then, by applying a force on these wind direction adjusting plates with an operating lever to change the curving direction of the wind direction adjusting plates either to the right or to the left, the direction of the wind being blown can be made to vary accordingly.

As an example of these wind direction adjusting plates, there is a type wherein a V-shaped slit is formed on the upper and lower surfaces of each wind direction adjusting plate to make it curve easily (Japanese Utility Model Laid-open No. 51-6643).

However, in the conventional grille for air conditioning mentioned above, in order to change the direction of the wind by changing the curving direction of the wind direction adjusting plates with the operating lever, depending on the position of the operating lever and because of the elastic forces acting on the wind direction adjusting plates, a considerable amount of operating force was needed. Also, when the wind direction adjusting plates were made to curve, since these wind direction adjusting plates are capable of curving naturally, there have been cases where these wind direction adjusting plates became twisted or distorted.

Further, when the strength and hardness of the various pieces were increased and the accuracy of the bearings and others were improved in order to solve the problems mentioned above, there arose the problems of greater weight of the grille for air conditioning as a whole and higher manufacturing costs.

Also, in the grille for air conditioning mentioned above, aside from the fact that the structure was complicated, there was the problem of the wind direction adjusting plates' not curving in a smooth manner. Further, there was the problem of noise being generated when a specially strong wind was being blown, because the end portions of the wind direction adjusting plates positioned at the location where the wind was being introduced were not aligned in the same direction as that of the coming wind.

Also, there have been cases wherein the wind direction adjusting plates became twisted because the pressure from the operating lever, that is used for changing the direction of the wind, is not transmitted evenly to the whole set of wind direction adjusting plates, causing the flow of the wind to become uneven and an air eddy to be generated. As a result, noise was generated, and the direction of the wind did not blow in the desired direction. And, also because of the irregularity of the slits mentioned earlier, noise was generated, and the direction of the wind did not blow in the desired direction.

Further, because an operating force, aside from the frictional forces that act on the bearings of the wind direction adjusting plates, and others, is needed to cause the elastic deformation of the wind direction adjusting plates, the required operating force becomes greater as the amount of curvature of the wind direction adjusting plates becomes larger.

Finally, when the wind direction adjusting plates were made to curve further by means of the operating lever, and the frictional forces on the bearings, and others, of the wind direction adjusting plates were small, there have been cases wherein the wind direction adjusting plates returned to their original state, that is, to their straight positions, because of the elastic forces acting on the wind direction adjusting plates themselves.

BRIEF DESCRIPTION OF THE DRAWINGS

FIG. 1 to FIG. 6 show a first embodiment of the present invention;

FIG. 9 and FIG. 10 are illustrations showing a third embodiment;

FIG. 11 and FIG. 12 are illustrations showing a fourth embodiment;

SUMMARY OF THE INVENTION

It is an object of the present invention to provide a grille for air conditioning wherein the wind direction adjusting plates curve in smooth circular arcs to allow the smooth flow of the wind, and wherein the generation of noise is minimized even when a specially strong wind is being blown.

It is another object of the present invention to provide a grille for air conditioning which is easy to manufacture and which can be assembled efficiently, thus leading to the minimization of the production costs.

It is another object of the present invention to provide a grille for air conditioning wherein the strength of the wind direction adjusting plates is sufficiently maintained, the curved state of these wind direction adjusting plates can be easily and securely maintained, and the wind direction adjusting plates can be made to curve easily in a prescribed direction with only a slight operating force on an operating piece.

It is another object of the present invention to provide a grille for air conditioning wherein the integration into one body of a wind direction adjusting plate with a supporting piece that supports it is secured.

It is another object of the present invention to provide a grille for air conditioning wherein the front end portion of the operating piece maintains a position at a fixed distance from the front wind direction adjusting plates, thus exhibiting efficiency of operation.

It is a further object of the present invention to provide a grille for air conditioning wherein an operating knob can be maintained in the middle portion even when the number of plates comprising the whole set of wind direction adjusting plates is odd, thus exhibiting efficiency of operation.

In order to realize the objects mentioned above, the present invention is structured to comprise a main case that has an opening from which wind is blown out, a plurality of flexible wind direction adjusting plates that extend in a direction substantially perpendicular to the direction of the flow of the wind, each wind direction adjusting plate having an (air stream) upstream side and a downstream side, the downstream side being fixed to the main case, supporting pieces having a plurality of extension plates that extend in straight lines from the upstream side of the flexible wind direction adjusting plates, these extension plates fixing the upstream side of the flexible wind direction adjusting plates such that they are not rotatable directly, and coupling plates that link the extension plates, and a moving means that moves the supporting pieces along a circular arc path relative to the main case, the circular arc path having a radius of curvature that is shorter than the span of the two aforementioned sides of the wind direction adjusting plates in their free state.

Other and further objects of the present invention will become obvious with an understanding of the illustrative embodiments which are about to be described and will be indicated in the appended claims, and various advantages not referred to herein will occur to one skilled in the art upon employment of the invention in practice.

DETAILED DESCRIPTION OF THE PREFERRED EMBODIMENTS

First Embodiment

A first embodiment exemplifying the present invention will be described below with reference to FIG. 1 to FIG. 6.

Figure 1:
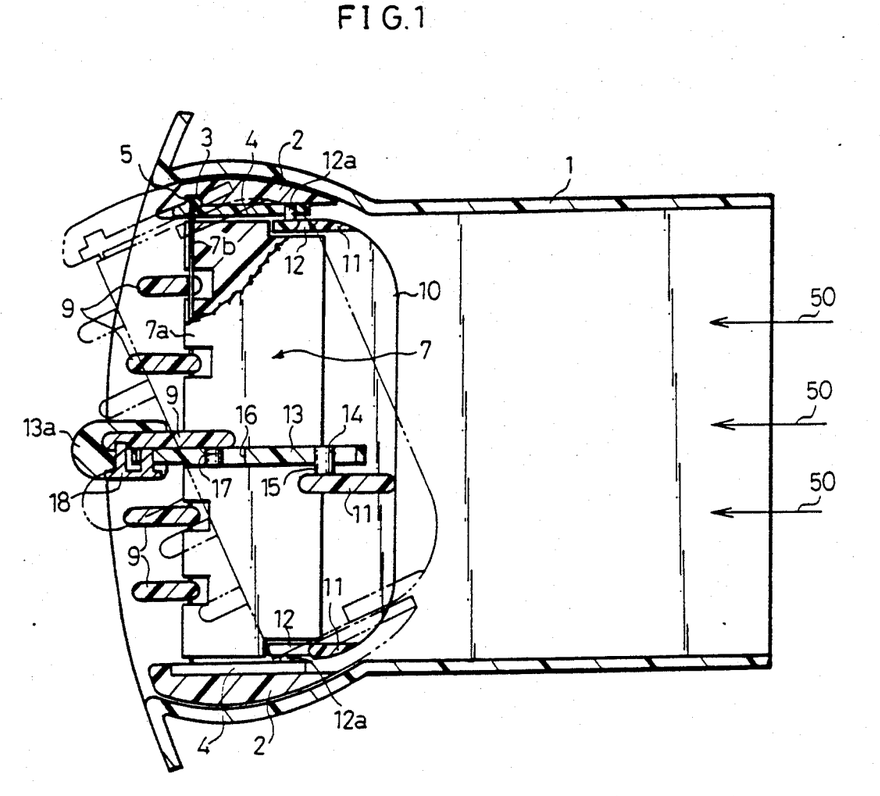
FIG. 1 is a side sectional view of a grille for air conditioning.
Figure 2:
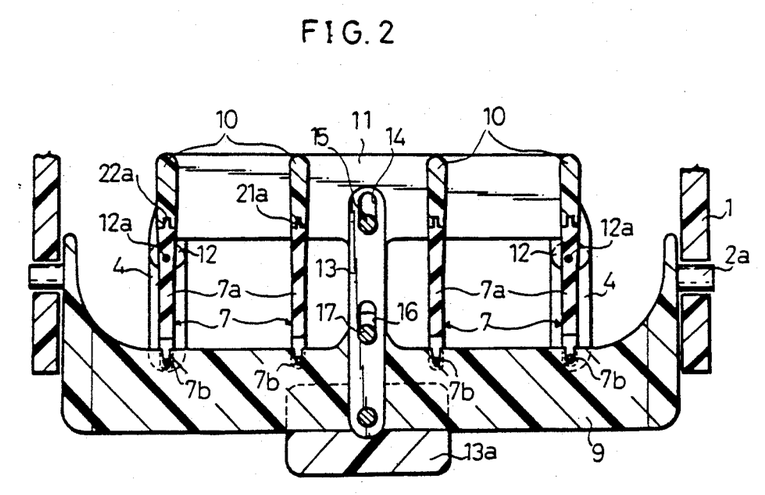
FIG. 2 is a plane sectional view of the grille for air conditioning.

As shown in FIG. 1 and FIG. 2, a barrel 2, serving as a main case, is rotatably supported inside a wind blowing duct 1 by means of a rotary shaft 2a shown in FIG. 2. On the front portion of the barrel 2 (on the left side of FIG. 1), four recessed engagement portions 3 are perforated, and a protruding engagement portion 5, formed on the front end portion of rods 4 that make up a parallel link, is inserted into and locks with each of the recessed engagement portions 3.

Figure 3:
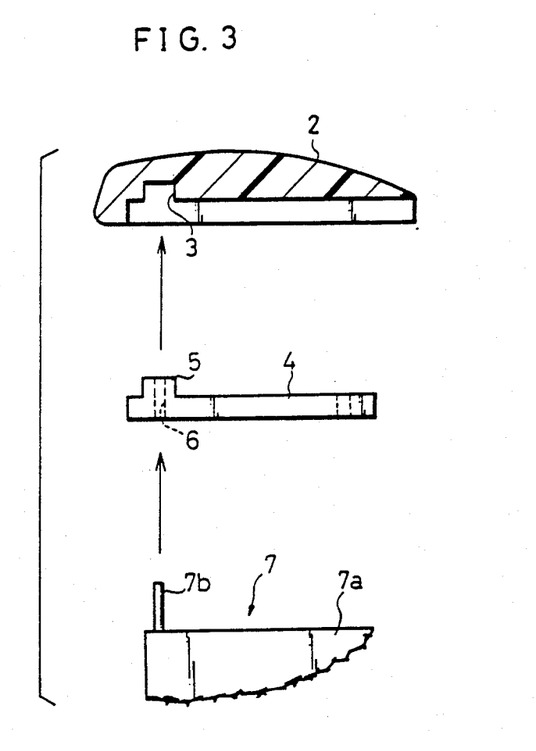
FIG. 3 is an exploded partial sectional view showing how the wind direction adjusting plates and rods are attached to the barrel.

As shown in FIG. 3, an insertion hole 6 is bored through the protruding engagement portions 5 of the rods 4. Hard shafts 7b, which are made of stainless steel, pierce through the front end portions of the four vertically extending wind direction adjusting plates 7 as shown in FIG. 2, and each of the shafts 7b passes through a corresponding insertion hole 6. Each of the wind direction adjusting plates 7 is made up of a flexible flat portion 7a, which is made of a soft material such as rubber, resin, metal, and others, and the above-mentioned hard shaft 7b.

In this construction, the rods 4 are sandwiched between the wind direction adjusting plates 7 and the barrel 2, thus preventing any possibility of the rods' slipping off. Also, each set of a rod 4 and a wind direction adjusting plate 7 is rotatably supported separately on the barrel 2. In this way the support structure at the front end portions of the rods 4 and wind direction adjusting plates 7 with respect to the barrel 2 is formed.

As shown in FIG. 1, five non-flexible secondary wind direction adjusting plates 9, that extend horizontally in the direction perpendicular to the flexible wind direction adjusting plates 7, are fixed to the barrel 2, in front of the flexible wind direction adjusting plates 7. These secondary wind direction adjusting plates 9 are supported by the exposed intermediate portions of the hard shafts 7b. Also, three coupling plates 11, that serve as coupling pieces which extend horizontally, are provided along the upper, middle and lower parts of the back portions of the wind direction adjusting plates 7. These coupling plates 11 are integrally connected to the extension plates 10 with the extension plates 10 being engaged to the rear end portions of the four wind direction adjusting plates 7. Extended portions 12, that also serve as coupling pieces, are formed extending toward the front from the left and right end portions of the upper and lower coupling plates 11 among the three coupling plates 11. Vertically extending rotary shafts 12a are provided on the extended portions 12 and are rotatably supported by being inserted into the holes on the rear end portions of the rods 4. When the extended portions 12 are moved sideways, the rods 4 rotate about the hard shafts 7b of the wind direction adjusting plates 7. In order to make the wind direction adjusting plates 7 curve such that their rear portions are aligned in the same direction as that of the wind coming from the rear portion of the wind blowing duct 1, the ratio of the distance between the hard shafts 7b that pass through the rods 4 and the rotary shaft 12a mentioned above, and the distance from the rear end portions of the wind direction adjusting plates 7 to the hard shafts 7b at their front portions is set to 0.75 to 1. This ratio can be set within the range of 0.65–0.85 to 1, but of these possible ratios, 0.75 to 1 is the most appropriate.

The extension plates 10, that make up a portion of a supporting piece, are fixed to the wind direction adjusting plates 7 by an insert-and-lock mechanism, toward the rear along a straight line extending from the upstream side of the wind direction adjusting plates 7. In other words, a recessed groove 22a is provided on the front end portion of each of the extension plates 10, vertically through its entire length, while on the other hand, a protruding portion 21a, which engages and locks with the groove 22a, is provided on the rear end portion of each of the wind direction adjusting plates 7. With the engagement of these two portions, an extension plate 10 and a wind direction adjusting plate 7 are combined to form a non-rotating unit, while, at the same time, maintaining the strength of the wind direction adjusting plate 7. With the extension plates 10 fixed to the wind direction adjusting plates 7, a smooth continuous surface is formed between them, allowing the wind 50 to flow smoothly through their surfaces. Also, each of the extension plates 10 are connected to the three coupling plates 11. These extension plates 10 and the coupling plates 11 make up a supporting piece that supports the wind direction adjusting plates 7. Thus the structure is such that the rear end portions of the wind direction adjusting plates 7 are always aligned in the same direction as that of the wind 50 coming from the rear portion of the wind blowing duct 1.

An operating rod 13, that extends from front to rear, is provided in the middle portion of the barrel 2 mentioned above. An elongated hole 14, into which a pin 15 is fixed to one of the coupling plates 11, is made at the rear portion of this operating rod 13. Also, another elongated hole 16 is made in the middle portion of the operating rod 13, and a pin 17, which is fixed to one of the above-mentioned front wind direction adjusting plates 9, is rotatably inserted into this hole 16. The operating rod 13 is such that it is substantially movable and rotatable in the direction of its length, but not substantially movable in the direction of its width. An operating knob 13a, acting as an operating piece in the shape of a rectangle, is connected to the front end portion of the operating rod 13 to cover a portion of one of the front wind direction adjusting plates 9, this operating knob being connected such that it is capable of sliding sideways. The front end portion of the above-mentioned operating rod 13 is formed such that it is inserted into a plane triangular recessed portion 13b provided in the center of the rear end portion of the operating knob 13a.

Figure 5:
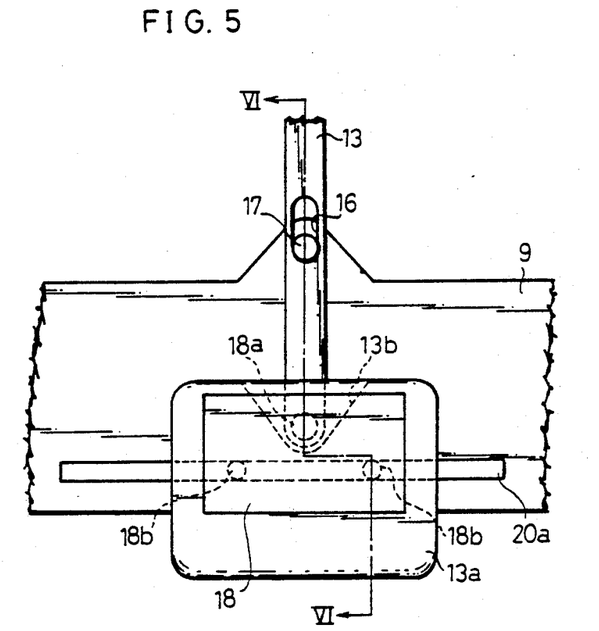
FIG. 5 is a bottom view showing the mounting structure of an operating piece.
Figure 6:
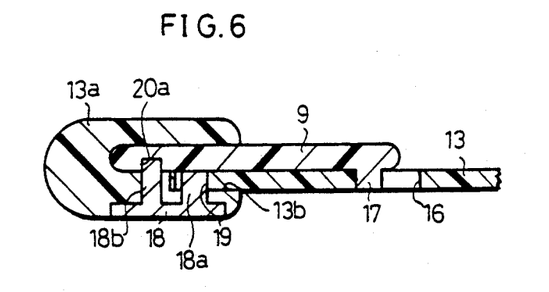
FIG. 6 is a sectional view taken along the line VI—VI in FIG. 5.

As shown in FIG. 5 and FIG. 6, a push piece 18, which is made of elastic resin and formed with a protruding shaft 18a located on its central rear portion, and two protruding guide portions 18b located on the left and right sides of this shaft 18a but a little toward the front, is fitted into the lower surface of the operating knob 13a. The shaft 18a of the push piece 18 is rotatably fitted into a hole 19 provided on the front end portion of the operating rod 13. Also, a groove 20a, that extends from left to right, is provided on the front end portion on the lower surface of the aforementioned secondary wind direction adjusting plate 9. The two protruding guide portions 18b of the push piece 18 are inserted into the groove 20a, such that they slide through it at a fixed frictional force.

Figure 4:
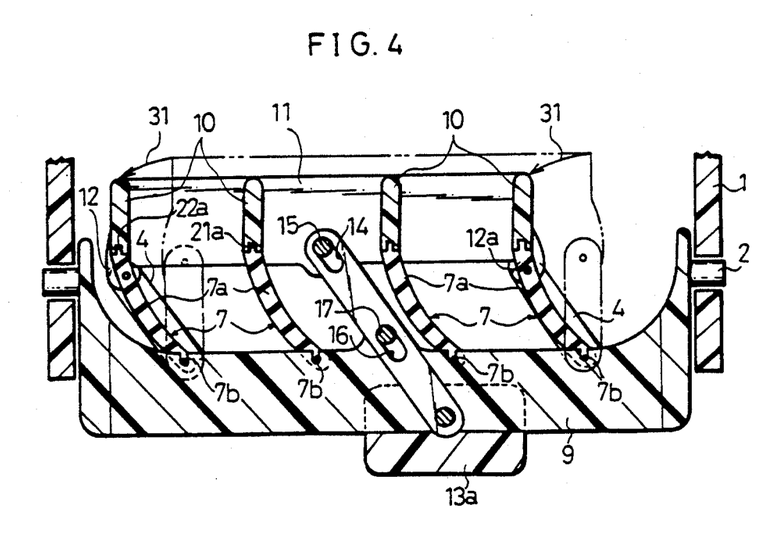
FIG. 4 is a plane sectional view showing the operation of the grille for air conditioning.

Then, by moving the operating knob 13a sideways, the supporting piece, made up of the extension plates 10 and the coupling plates 11, moves along a curved path 31 shown in FIG. 4. Here, the curved path 31 has a radius of curvature that is smaller than the span of the two sides of the wind direction adjusting plates 7 in their free state. This radius of curvature is determined from the distance between the end portions of the rods 4 mentioned earlier. Consequently, the wind direction adjusting plates 7 are caused to curve in a prescribed direction.

The operation of the grille for air conditioning constructed as above is described, and its effects are mentioned.

As shown in FIG. 1 and FIG. 2, when the operating knob 13a is in the vertical and lateral central location, the wind 50 coming from the rear portion of the wind blowing duct 1 blows straight forward after passing through the extension plates 10, the flexible wind direction adjusting plates 7, and the secondary wind direction adjusting plates 9.

Then, when the operating knob 13a is made to slide to the right, as shown in FIG. 5 and FIG. 6, the two protruding guide pieces 18b of the push piece 18, that has been inserted into the lower surface of the operating knob, slide along the groove 20a provided on the lower surface of one of the secondary wind direction adjusting plates 9. At the same time, the shaft 18a on the push piece 18, that is engaged with the front end portion of the operating rod 13, moves the operating rod 13 in the same direction as that of the operating knob 13a. Since a structure is employed for the above-mentioned push piece 18 such that the protruding guide pieces 18b and the shaft 18a becomes simultaneously engaged with the secondary wind direction adjusting plate 9 and the operating rod 13, respectively, an excellent locking mechanism is realized.

Thus, when the operating knob 13a is made to slide to the right as shown in FIG. 4, the operating rod rotates about the pin 17 which has been inserted into the elongated hole 16 provided on its central portion, while moving forward up to an allowable distance determined by the two elongated holes 14, 16, and its rear end portion moving in the direction opposite to that of the operating knob 13, that is, to the left. Then, the rear end portions of the wind direction adjusting plates 7, which are supported by the extension plates 10 and integrally connected by means of the coupling plate 11 and the pin 15 that is inserted into the elongated hole 14 on the rear end portion of the operating rod 13, are moved to the left while their path of motion is being regulated by the rods 4 and as the span between them and the hard shafts 7b becomes shorter. During this time, since the ratio of the distance between the hard shafts 7b and the shafts of rotation 12a on the rods 4, and the distance between the hard shafts 7b on the front end portions of the wind direction adjusting plates 7 and their rear end portions is set to 0.75 to 1, the rear end portions of the wind direction adjusting plates 7 will be approximately in the same direction as that of the wind 50 coming from the rear portion of the wind blowing duct 1.

It is in this manner that the wind direction adjusting plates 7 are made to curve into arced plates that bulge to the left. Since the frictional force between the protruding guide pieces 18b of the push piece 18 and the groove 20a on the operating rod 13 serve to counteract the restoring force of the wind direction adjusting plates 7, the configuration of the wind direction adjusting plates 7 are thus easily and securely maintained. As a result the wind 50 coming from the rear portion of the wind blowing duct 1 passes through the wind direction adjusting plates 7, flows smoothly toward the right, and then blows out from the front end portion of the wind blowing duct 1. The structure is also effective in minimizing the generation of noise when a specially strong wind is being blown. Also, the horizontal rods 4 rotate counterclockwise, as shown in FIG. 4, about the protruding engagement portion 5 which is inserted into the recessed engagement portion 3 of the barrel 2 shown in FIG. 3. Since the rods 4 are securely held in place between two components, namely, the wind direction adjusting plates 7 and the barrel 2, there is no possibility that they may slip off, while being free to rotate relative to the barrel 2.

Next, when the operating knob 13a is moved downward, as shown by the two-point chain lines in FIG. 1, the barrel 2, as one unit with the flexible wind direction adjusting plates 7, secondary wind direction adjusting plates 9, extension plates, and others, rotates counterclockwise as also shown in FIG. 1. Therefore, the wind 50 coming from the rear portion of the wind blowing duct 1 is caused to blow downward through the secondary direction adjusting plates 9 located on the front portion of the wind blowing duct 1.

As mentioned above, in the grille for air conditioning of the present invention, since the rods 4 and barrel 2 are provided with simply shaped protruding engagement portions 5 and recessed engagement portions 3 for attaching the rods 4 and the wind direction adjusting plates 7 to the barrel 2, instead of the complicated protruding piece employed in conventional types, the structure of the barrel 2 and the rods 4 becomes simple. Also, by employing a structure wherein the hard shafts 7b of the wind direction adjusting plates 7 are inserted into the open insertion holes 6 of the rods 4, and the protruding engagement portions 5 of the rods 4 are inserted into the recessed engagement portions 3 on the barrel 2, the wind direction adjusting plates 7 and the rods 4 are enabled to be attached simultaneously to the barrel 2, thus decreasing the required number of assembly procedures and, at the same time, improving the assembly operation.

Also, the attachment of the pieces is excellent in that a push piece 18, that has protruding guide portions 18b and a shaft 18a, is fitted into the lower surface of the operating knob 13a, these protruding guide portions 18b and the shaft 18a being made to simultaneously engage with one of the secondary wind direction adjusting plates 9 and the operating rod 18, respectively.

The present invention can also be constructed as in the following examples.

That is, in the embodiment just mentioned, the open insertion holes 6, through which the hard shafts 7b of the wind direction adjusting plates 7 are inserted, were made on the rods 4. However, the holes 6 can be made to have closed bottoms as long as they are holes that can rotatably support the hard shafts 7b of the wind direction adjusting plates 7.

Also, the principle related to making the wind direction adjusting plates 7 curve to a constant curving state is based on an invention which has already been filed for application by the same inventors U.S. patent application Ser. No. 258,313).

Second Embodiment

In the present embodiment, the structure of the integral connection between the downstream side of the extension plates 10 and the upstream side of the flexible wind direction adjusting plates 7 in the first embodiment is modified, while other aspects of the structure are the same as those of the first embodiment.

Figure 7:
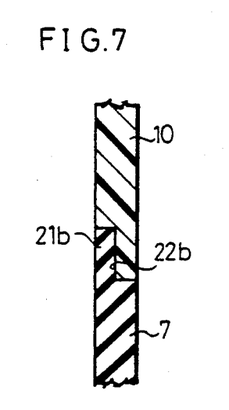
FIG. 7 and FIG. 8 show a secondary embodiment; they are sectional views showing the linkage structure of a wind direction adjusting plate and an extension plate.
Figure 8:
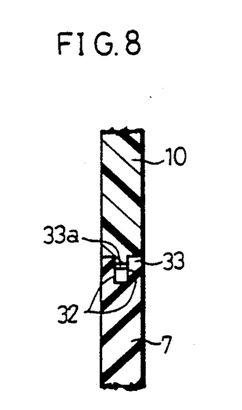

As shown in FIG. 7, a groove 22b is formed by the L-shaped cross section at the end portion of the downstream side of the extension plates 10 and a protrusion 21b is likewise formed by the L-shaped cross section on the upstream side of the wind direction adjusting plates 7. The extension plates 10 and the wind direction adjusting plates 7 are integrally connected by engagement of the protrusions 21b and the grooves 22b. Also, as shown in FIG. 8, the structure can be made such that vertically extending protrusions 33 are provided on the upstream side of the wind direction adjusting plates 7 a pair of grooves 32, that engage with the protrusions 33, are provided on the downstream side of the extension plates 10 and a hole 33a is provided between the pair of grooves 32 which is filled to become an integral part of the wind direction adjusting plates 7. This structure is formed by insert forming method wherein the resin, that makes up the wind direction adjusting plates 7, is poured into a metal mold and then formed appropriately, with the extension plate 10, that has the pair of grooves 32 from which the hole 33a is formed, serving as the insert.

By applying the above structure, with a part of the wind direction adjusting plates 7 being embedded into the hole 33a provided between the pair of grooves 32 on the extension plates 10, the integration of the wind direction adjusting plates 7 and the extension plates 10 can be reliably accomplished, and the surfaces of the extension plates 10 and of the wind direction adjusting plates 7 become a smooth continuous surface, allowing the wind 50 coming from the rear portion of the wind blowing duct 1 to flow smoothly along these surfaces. As to the other aspects, the present embodiment also operates as the first embodiment and exhibits the same effects as the first embodiment.

Third Embodiment

Figure 9:
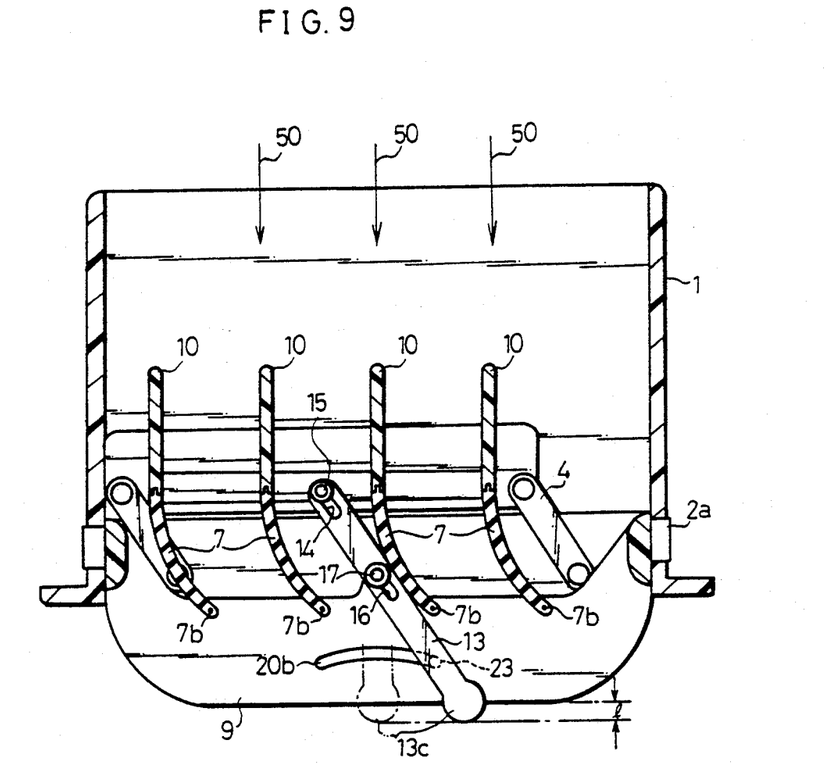
FIG. 9 is a plane sectional view showing a grille for air conditioning.
Figure 10:
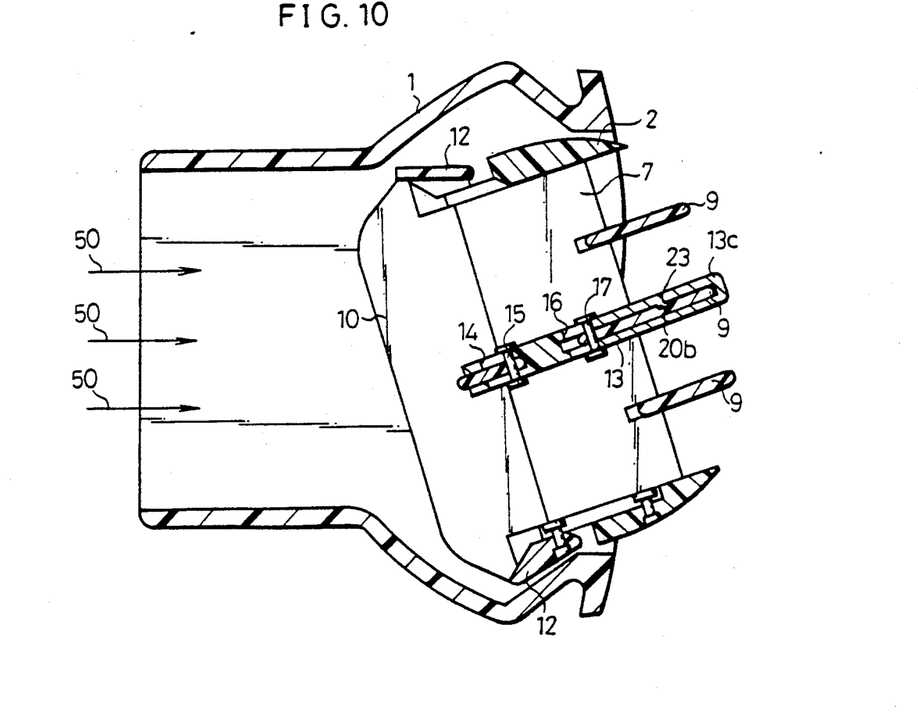
FIG. 10 is a side sectional view showing the same grille for air conditioning.

As shown in FIG. 9 and FIG. 10, in the present embodiment, the groove 20b, which, in the first embodiment, has been provided on the lower surface of one of the secondary wind direction adjusting plates 9, is now provided on the upper surface, and, as shown in FIG. 9, is formed in the shape of an arc that curves upward, and the structure of the front end portion of the operating piece is configured as described. Namely, an operating knob 13c is formed in the shape of a circular plate at the front end portion of the operating rod 13, and a protrusion 23, serving as a protruding piece that is fitted into a groove 20b on one of the secondary wind direction adjusting plates 9, is provided on the lower surface of the operating rod 13.

By applying this structure, when the operating knob 13c is moved sideways, since the protrusion 23 on the operating rod 13 moves according to the shape of the groove 20b on the secondary wind direction adjusting plate 9, as the rotation of the operating rod 13 becomes larger, the pin 15 on the coupling plate 11 and the pin 17 on the secondary wind direction adjusting plate 9 move further toward the rear within the limits of the elongated holes 14, 16, respectively, on the operating rod 13. As a result, the front end portion of the operating knob 13c moves sideways while always maintaining a constant distance from the front end portion of the secondary wind direction adjusting plate 9.

Therefore, since the operating knob 13c can be operated at a constant distance from the front end portion of the secondary wind adjusting plate 9 and there is no possibility that the operating knob 13c will protrude largely from the front end portion of the secondary wind direction adjusting plate 9, the operating efficiency is improved. Also, since the operating rod 13 does not move along a simple circular arc with center at the pin 17, but rather, the protrusion 23 on the operating rod 13 is guided by the groove 20b on the secondary wind direction adjusting plate 9 and the pins 15, 17 move within the elongated holes 14, 16, respectively, the effect of a moderate amount of operating force to operate the rod is obtained, giving rise to a feeling of smooth and easy operation when the operating knob 13c is moved. As to the other aspects of this embodiment, the operation is the same as that for the first embodiment, and the present embodiment also exhibits the same effects.

Fourth Embodiment

Figure 11:
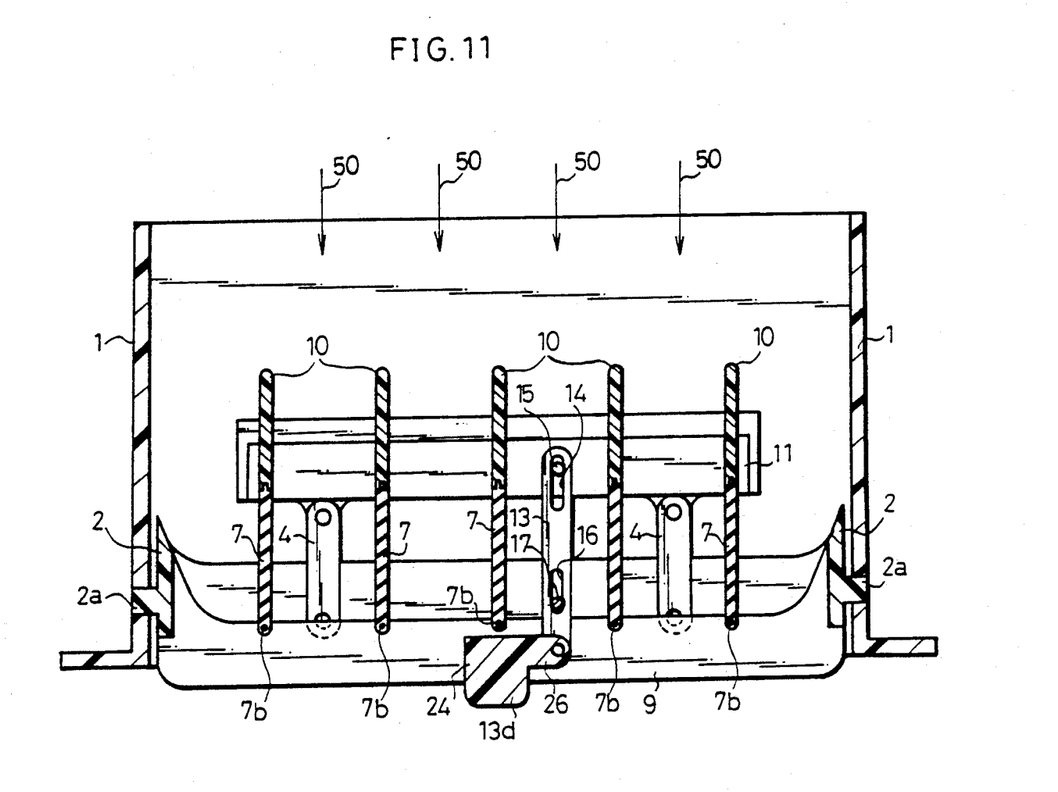
FIG. 11 is a plane sectional view showing a grille for air conditioning.

As shown in FIG. 11, the present embodiment is structured such that there is an odd number of flexible wind direction adjusting plates 7, that is, five plates and the rods 4, that make up a parallel link, are arranged within the interval between the leftmost and rightmost wind direction adjusting plates 7, and the operating piece is as described later, while the other aspects of the structure are the same as those in the First Embodiment.

Figure 12:
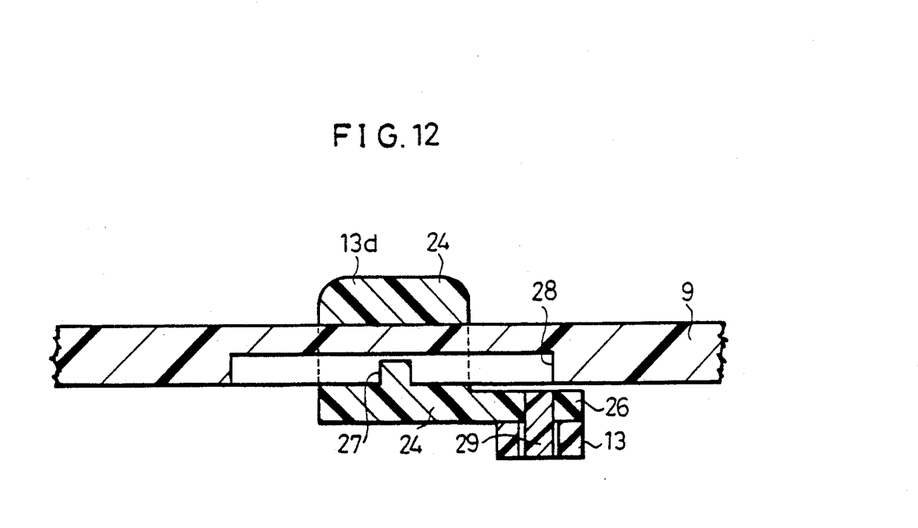
FIG. 12 is a sectional view showing the mounting structure of an operating piece.

As shown in FIG. 11 and FIG. 12, the operating knob 13d, serving as the operating piece, is located on the central portion of one of the secondary wind direction adjusting plates 9, and is made up of a pair of holding pieces 24 that sandwich the front end portion of the secondary wind direction adjusting plate 9 from above and below, with a coupling piece 25 that integrally connects the front end portions of the holding pieces 24, and an arm that protrudes to the right, from the lower holding pieces 24, and engages with the front end portion of the operating rod 13. A protruding portion 27 is integrally formed on the upper surface of the lower holding piece 24, this protruding portion 27 being fitted into a guiding groove 28 formed on the center front portion of the lower surface of the secondary wind direction adjusting plate 9. A shaft 29 protrudes from the lower surface of an arm 26 and is engaged with the front end portion of the operating rod 13.

Also, the pin 15, that is provided in the coupling plate 11, and the pin 17, that is provided on the secondary wind direction adjusting plate 9, are located in a position shifted a little to the right of the central position. These pins 15, 17 are fitted into the elongated holes 14, 16, respectively, on the operating rod 13.

In the structure described above, there is an odd number of wind direction adjusting plates 7 that conforms with the shape of the opening of the grille for air conditioning and with the direction of flow of the wind 50. Because of this, even when the operating rod 13 is in a position shifted to the right of the central position, by a simple modification of the structure, the operating knob 13a, which is the operating piece, can be positioned on the central portion of the easily operable grille for air conditioning. As to the other aspects of the present embodiment, the operations are the same as those of the first embodiment, and the same effects are also exhibited.

As many apparently widely different embodiments of this invention may be made without departing from the spirit and scope thereof, it is to be understood that the invention is not limited to the specific embodiments thereof except as defined in the appended claims.

What is claimed is:

1. A grille for air conditioning comprising:
   a main body case having an opening for blowing out a wind,
   a plurality of curvable wind direction adjusting plates supported so as to be rotatable relative to said main body case, each of said wind direction adjusting plates having a proximal edge located at a downstream side of the wind and a distal edge located at an upstream side of the wind, both said edges extending in a plane substantially intersecting with a blowing direction of the wind,
   a support member supporting said distal edges of said wind direction adjusting plates, said support member having extension plates respectively extending along an extending plane of said distal edge of each said wind direction adjusting plate and coupling plates coupling said extension plates with each other, said each extension plate having a groove for receiving said distal edge which is not rotatable relative to said extension plate,
   moving means for moving said support member on a circular locus relative to said main body case, said arc having a shorter radius of curvature than a span between said two edges of said wind direction adjusting plate in an unstressed configuration.

2. A grille for air conditioning, as set forth in claim 1, wherein the grooves on said extension plates are provided substantially along the entire length of the extension plates.

3. A grille for air conditioning, as set forth in claim 1, wherein said end portions of the upstream sides of said flexible wind direction adjusting plates have protrusions that are received by the grooves on said extension plates, the connection between them being formed such that their surfaces are smooth when the flexible wind direction adjusting plates are connected to the extension plates.

4. A grille for air conditioning, as set forth in claim 3, wherein the grooves on said wind extension plates are provided substantially along the entire length of the extension plates.

5. A grille for air conditioning, as set forth in claim 1, wherein the ratio of the radius of curvature of said circular arc path and said span is within the range of 0.65–0.85 to 1.

6. A grille for air conditioning, as set forth in claim 5, wherein the ratio of the radius of curvature of said circular arc path and said span is 0.75 to 1.

7. A grille for air conditioning, as set forth in claim 1, wherein the moving means has a rod whose one end is connected to said supporting piece and the other end is connected to the main case, with said rod, said main case, and the supporting piece making up a parallel link and said radius of curvature being defined by the distance between the two ends of said rod.

8. A grille for air conditioning, as set forth in claim 7, wherein said downstream sides of said flexible wind direction adjusting plates have hard shafts.

9. A grille for air conditioning, as set forth in claim 8, wherein said hard shafts are supported by the main case at both ends, said rods are connected to the main case such that they are coaxial with the the hard shafts, and the rods are substantially sandwiched and maintained between said flexible wind direction adjusting plates and the main case.

10. A grille for air conditioning, as set forth in claim 1, wherein the upstream sides of the flexible wind direction adjusting plates have hard shafts.

11. A grille for air conditioning, as set forth in claim 10, wherein said main case is equipped with a plurality of secondary wind direction adjusting plates that rotatably support said hard shafts, said secondary wind direction adjusting plates extending in the direction perpendicular to said flexible wind direction adjusting plates and being located in the downstream side of the flexible wind direction adjusting plates.

12. A grille for air conditioning, as set forth in claim 1, wherein said main case is equipped with secondary wind direction adjusting plates, said secondary wind direction adjusting plates extending in a direction perpendicular to said flexible wind direction adjusting plates and located in the downstream side of the flexible wind direction adjusting plates; and said moving means has an operating means that is arranged substantially parallel to said flexible wind direction adjusting plates, one end of said operating means being an operating portion, the middle portion being engaged with one of the secondary wind direction adjusting plates, and the other end being engaged with said support member.

13. A grille for air conditioning, as set forth in claim 12, wherein said operating means comprises a knob slidably mounted to one of said secondary wind direction adjusting plates and an operating rod, one end of said operating rod being rotatably engaged with said knob, a middle portion being engaged with said secondary wind direction adjusting plate and the other end being engaged with said support member, said operating rod being movable in the direction of its length and pivotal relative to said secondary wind direction adjusting plate and said support member but not substantially movable with respect thereto in the direction of a width thereof.

14. A grille for air conditioning, as set forth in claim 13, wherein said operating rod has elongated holes in said other end and middle portion, said supporting piece has a shaft that engages with one of said elongated holes, and said secondary wind direction adjusting plate has a shaft that engages with said elongated hole.

15. A grille for air conditioning, as set forth in claim 13, wherein said secondary wind direction adjusting plate has a groove that extends in the direction of its length, and said knob has a protruding guide portion that engages with said groove.

16. A grille for air conditioning, as set forth in claim 14, wherein said end of the operating rod is engaged to said knob such that frictional forces are generated in a shaft made of elastic resin.

17. A grille for air conditioning, as set forth in claim 16, wherein said secondary wind direction adjusting plate has a groove that extends in the direction of its length, and said knob is provided with a push piece, said push piece having a shaft that engages with one end of said operating rod and protruding guide pieces that engage with the groove on said secondary wind direction adjusting plate.

18. A grille for air conditioning, as set forth in claim 13, where there is an odd number of said flexible wind direction adjusting plates greater than or equal to three, said knob is located in the middle portion of said secondary wind direction adjusting plate and has an arm that engages with one end of the operating rod, and the operating rod is located between said wind direction adjusting plates.

19. A grille for air conditioning, as set forth in claim 12, wherein said operating means essentially comprises an operating rod and a curved groove that is formed on said secondary wind direction adjusting plate, and has a protruding portion that engages with said groove, located on one end of said operating rod, with the middle portion of said operating rod being engaged with said secondary wind direction adjusting plate and the other end being engaged with said support member, said operating rod being substantially rotatable and movable in the direction of its length with respect to said secondary wind direction adjusting plate and said support member but not substantially movable in the direction of its width with respect thereto; one end of said operating rod protrudes from said secondary wind direction adjusting plate, and when the aforementioned one end of said operating rod is moved along the secondary wind direction adjusting plate, the amount of protrusion of the operating rod from the secondary wind direction adjusting plate is maintained essentially constant.

* * * * *